United States Patent
Kester et al.

(10) Patent No.: US 11,821,459 B2
(45) Date of Patent: Nov. 21, 2023

(54) UNIVERSAL HOUSING

(71) Applicant: Thumper Fabrication, LLC, Marshall, TX (US)

(72) Inventors: Jeff Kester, Marshall, TX (US); Jesse Johnson, Marshall, TX (US)

(*) Notice: Subject to any disclaimer, the term of this patent is extended or adjusted under 35 U.S.C. 154(b) by 0 days.

(21) Appl. No.: 17/848,730

(22) Filed: Jun. 24, 2022

(65) Prior Publication Data
US 2023/0332639 A1 Oct. 19, 2023

Related U.S. Application Data

(60) Provisional application No. 63/332,219, filed on Apr. 18, 2022.

(51) Int. Cl.
*F16C 11/06* (2006.01)
*B60G 7/00* (2006.01)

(52) U.S. Cl.
CPC .......... *F16C 11/0623* (2013.01); *B60G 7/005* (2013.01); *B60G 7/001* (2013.01); *B60G 2204/416* (2013.01); *B60G 2206/124* (2013.01)

(58) Field of Classification Search
CPC ..... F16C 11/0623; B60G 7/005; B60G 7/001; B60G 2204/416; B60G 2206/124
See application file for complete search history.

(56) References Cited

U.S. PATENT DOCUMENTS

| | | | | |
|---|---|---|---|---|
| 5,398,411 A * | 3/1995 | Kusaka | ................... | B23P 13/04 72/255 |
| 9,168,801 B2 * | 10/2015 | Dicke | ..................... | B60G 7/001 |
| 10,731,700 B2 * | 8/2020 | Hernandez | ........... | F16C 11/0666 |
| 11,130,378 B1 * | 9/2021 | Lambert | ................ | B60G 7/008 |
| 11,203,240 B2 * | 12/2021 | Bowden, Jr. | ........... | B60G 7/001 |
| 2009/0220341 A1 * | 9/2009 | Schmaling | .............. | B64C 27/48 416/114 |
| 2012/0021241 A1 * | 1/2012 | Perry | ....................... | B60G 3/06 29/428 |
| 2015/0251512 A1 * | 9/2015 | Karpman | ............ | F16C 11/0614 29/898.04 |
| 2016/0059652 A1 * | 3/2016 | Weifenbach | ........... | B62D 17/00 280/124.144 |
| 2018/0112705 A1 * | 4/2018 | Hernandez | .......... | F16C 11/0642 |
| 2022/0235817 A1 * | 7/2022 | Johnston | ................ | F16F 1/3842 |

OTHER PUBLICATIONS

Greene, Brenan, "Uniballs and Ball Joints: Delta Joint Retrofit on Icon Tubular UCA" [Online]; Trail 4Runner Blog; Sep. 29, 2019; [retrieved online May 3, 2023]. Retrieved from the internet: <URL:https://trail4runner.com/2019/09/29/uniball-ball-joints-delta-joint-retrofit-on-icon-tubular-uca/>. (Year: 2019).*

* cited by examiner

*Primary Examiner* — Drew J Brown
*Assistant Examiner* — Tiffany L Webb
(74) *Attorney, Agent, or Firm* — Bobby W. Braxton; Gregory Perrone; Braxton Perrone, PLLC

(57) ABSTRACT

A system and method for a universal housing. The universal housing has a central void. The system also includes a sleeve sized to be received within the central void. The universal housing can be used to house a ball joint and a uniball interchangeably. This allows the consumer to switch between a ball joint or a uniball joint without replacing the support arm. This aids in flexibility and versatility as well as decreases the product and labor costs associated with changing from one type to another.

8 Claims, 3 Drawing Sheets

UNIVERSAL HOUSING

PRIORITY

The present application claims priority to U.S. Provisional No. 63/332,219, filed Apr. 18, 2022, the entirety of which is hereby incorporated by reference.

BACKGROUND OF THE INVENTION

Technical Field

The present invention relates to a system and method for a compatible housing for ball joints and uniball joints.

Description of Related Art

Wheels are connected to a vehicle's suspension via ball joints or uniball joints. The housing which receives either the ball joints or uniball joints are dissimilar. Accordingly, the owner must make the decision whether to go with a ball joint or uniball early in the decision to obtain the proper mount. Ball joints and uniballs have different advantages and disadvantages. If an owner or mechanic wants to switch from a ball joint to a uniball, as an example, the entire housing must be swapped. Consequently, there is a need for a better housing.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Ball joints, either conventional or uniball, connect a wheel to the suspension of a vehicle. The vehicle can include a car, truck, ATV, etc.

Figure 1:
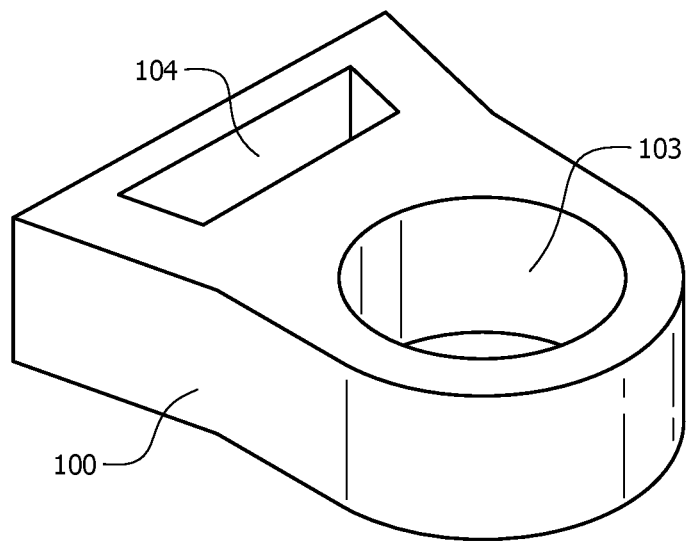
FIG. 1 is a perspective view of a housing in one embodiment.

FIG. 1 is a perspective view of a housing in one embodiment. As shown the housing 100 has a void 103 which receives either a ball joint or a uniball, as described in more detail below. The void 103 extends from the top surface of the housing 100 to the bottom surface of the housing. The size of the void 103 can vary depending upon the application. For example, a smaller ATV will have a smaller void 103 than a large truck. In one, non-limiting embodiment, the housing 100 has a length, as measured as the dominant axis, of about 3.25 inches. The void 103 has a diameter opening of about 1 to about 3 inches. In one embodiment the void 103 has a diameter of about 1.628 inches. As noted, these dimensions are for illustrative purposes only and should not be deemed limiting.

The housing 100 can comprise virtually any material. It can comprise metal, plastics, and combinations thereof. In one embodiment the housing 100 comprises steel.

The housing 100 also comprises a coupler 104. The coupler 104 is any device, void, fastener, etc. which allows the housing 100 to couple to other equipment, such as a control arm, discussed in more detail below. In one embodiment the coupler 104 comprises a void which can receive a control arm or other equipment.

Figure 2:
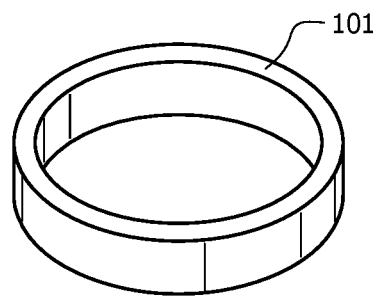
FIG. 2 is a perspective view of a sleeve in one embodiment.

Turning to FIG. 2, FIG. 2 is a perspective view of a sleeve 101 in one embodiment. A sleeve 101, as used herein, refers to material which fits within the void 103 of the housing 100. In one embodiment the sleeve 101 is used with a conventional ball joint, as described in more detail below. The sleeve 101 can comprise virtually any material. It can comprise the same or different material as the housing 100.

In one embodiment the sleeve 101 is sized so as to fit within the internal diameter of the void 103. The sleeve 101 can be maintained in the desired location within the void 103 via friction or a separate mechanical fastener such as a bolt, screw, or the like. In one embodiment the two are coupled together via press fit.

Figure 3:
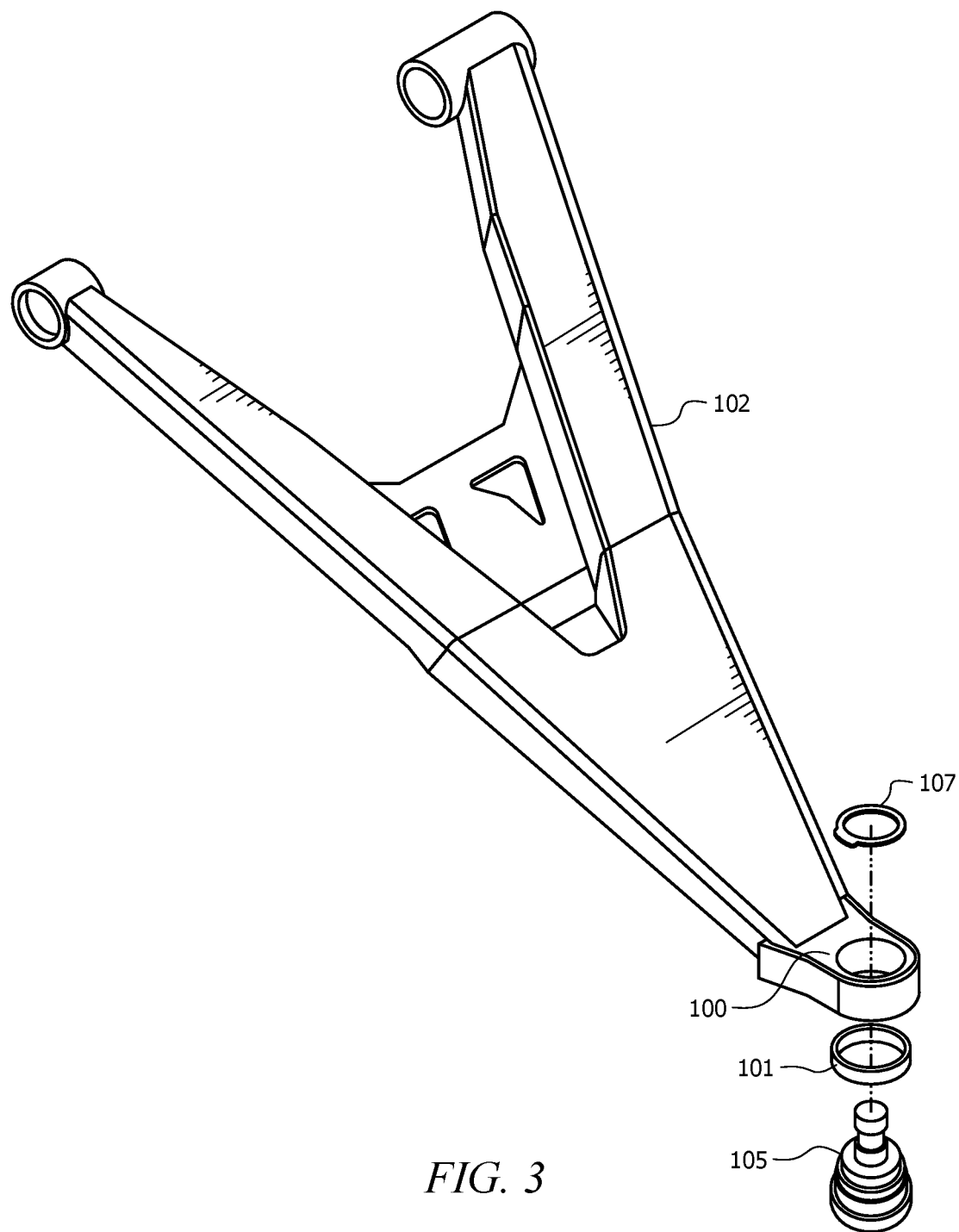
FIG. 3 is a perspective view of a control arm coupled to a housing and a ball joint in one embodiment.

Turning now to FIG. 3, FIG. 3 is a perspective view of a control arm coupled to a housing and a ball joint in one embodiment. FIG. 3 shows a control arm 102 which couples to the housing 100. While a control arm 102 is depicted, this is for illustrative purposes only and should not be deemed limiting. The universal housing 100 discussed herein can couple to any traditional equipment to which housings couple.

In FIG. 3 a ball joint 105 is utilized. A ball joint 105, in one embodiment, comprises of a ball and a socket. Ball joints 105 are often better for off-roading with medium loads. Some people believe that the uniball systems are better for extreme off-roading but have reduced service life compared to ball joints which generally featured sealed or semi-sealed construction. The uniball, conversely, generally features an open structure which allows dirt, dust, etc. to enter and wear down the internal components.

The ball joint has a range of motion of approximately 90 degrees in some embodiments whereas the uniball typically has a decreased range of motion. Maintenance is also different as the uniball requires more maintenance. As can be seen, there is no one sized-fits-all approach. There are instances where a conventional ball joint is superior and situations where the uniball is superior. Consequently, there is much debate about which solution should be implemented.

Previously, a corresponding housing had to be selected depending upon which joint is utilized: ball joint or uniball. If a consumer opted for a uniball, then a corresponding housing was utilized. The housing would then often be welded to the control arm. That consumer was then stuck with the uniball. If the consumer's needs changed over time and the consumer then desired to switch to a ball joint, the user would then have to replace the control arms 102, the housing, and install the new ball joint on the new housing and the new control arms 102. This is an expensive switch.

Because consumers have to previously make the decision, ball joint or uniball, early in the process, they often regretted that decision. As noted above, changing that decision later is costly.

Figure 4:
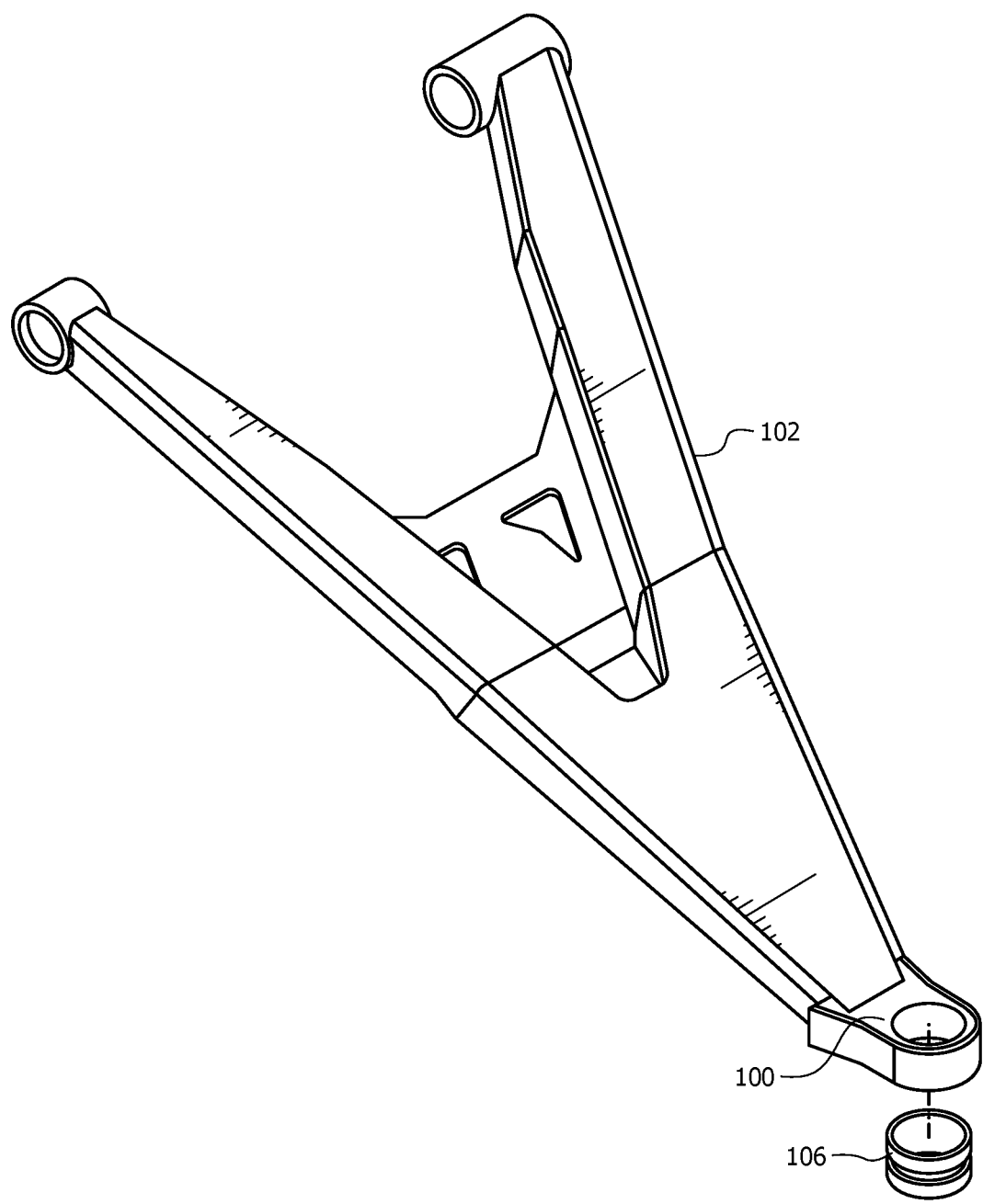
FIG. 4 is a perspective view of a control arm coupled to housing and a uniball in one embodiment.

The universal housing 101 described herein can accept either a ball joint 105 or a uniball (106 in FIG. 4). This has several advantages. First, if a consumer opts to go with a ball joint, as an example, that decision is less consequential than it previously was. If the consumer decides to subsequently switch to a uniball, then neither the control arm 102 nor the housing 100 need to be changed. Instead, the ball joint 105 and sleeve 100 are simply removed, and the uniball 106 installed. This is a significant cost savings and removes one of the hurdles between making the change from one type to another. Not only are the additional material costs avoided, but the labor costs associated with changing the control arms 102, for example, are also eliminated.

Second, if a ball joint, for example, were to go out, previously, the consumer was forced to replace it with another ball joint if the consumer wanted to avoid the extra costs associated with the switch. However, with the universal housing 100 discussed herein, if the ball joint were to go out, and the consumer wanted to give the uniball a try, the consumer could do so without the added labor and material costs previously associated with the switch.

In the embodiment depicted, FIG. 3 shows the control arm 102 coupled to the universal housing 100. As used herein, the term universal housing refers to a housing which can accept a ball joint or a uniball without any structural modification being required to the housing.

As shown, a portion of the control arm 102 is received into the coupler 104 of the housing 100. The control arm 102 is then coupled to the housing 100 via any method or device known in the art. In one embodiment the control arm 102 is welded to the housing 100.

Once the universal housing 100 has been coupled to the control arm 102, the ball joint is installed. As shown in FIG. 3, a conventional ball joint is utilized. The sleeve 100 is coupled to the ball joint 105, and then coupled to the housing 100. The sleeve 100 re-sizes the void 103 of the housing 100 so that it properly accepts the ball joint 105.

A cap 107 can then be coupled to the ball joint 105, securing the ball joint 105 in its desired place adjacent the housing 100. The cap can comprise a cap, snap ring, locking ring, etc., depending upon the ball joint design.

Turning now to FIG. 4, FIG. 4 is a perspective view of a control arm coupled to a housing and a uniball in one embodiment. FIG. 4 is similar to FIG. 3, but in FIG. 4 a uniball 106 is utilized. In this embodiment, when the uniball 106 is utilized there is no need for the sleeve 100. This is because the void 103 in the housing 100 is sized to receive the uniball 106 without re-sizing.

As can be seen, if the ball joint 105 in FIG. 3 is going to be replaced with the uniball 106 of FIG. 4, the first step is removing the cap 107 and removing the ball joint 105. The sleeve 101 is then removed. With the sleeve 101 being removed, the uniball 106 can simply be inserted into the void 103 of the housing 100 and installed.

While the invention has been particularly shown and described with reference to a preferred embodiment, it will be understood by those skilled in the art that various changes in form and detail may be made therein without departing from the spirit and scope of the invention.

What is claimed is:

1. A system for universal housing, said system comprising:
   a universal housing comprising a central void;
   a sleeve sized to be received within said central void;
   wherein said universal housing can couple to a ball joint by utilizing said sleeve or a uniball by removing said sleeve, wherein said universal housing is configured to separately be coupled to a ball joint and a uniball without any structural modification being required to the universal housing.

2. The system of claim 1 wherein said universal housing further comprising a coupler.

3. The system of claim 1 wherein said universal housing is coupled to a control arm.

4. The system of claim 1 wherein said sleeve is removeably coupled with said universal housing.

5. The system of claim 1 further comprising the ball joint which couples to said sleeve and said central void.

6. The system of claim 1 wherein said sleeve is removed and further comprising the uniball which couples directly to said central void.

7. The system of claim 1 wherein said ball joint and said uniball can be installed interchangeably.

8. The system of claim 7 wherein said system further comprises a control arm coupled to said universal housing, and wherein said ball joint and said uniball can be interchanged without replacing said control arm.

\* \* \* \* \*